United States Patent
Yamana et al.

[11] Patent Number: 5,973,805
[45] Date of Patent: Oct. 26, 1999

[54] ANTIGLARE INNER MIRROR

[75] Inventors: Toru Yamana; Naoto Iwanabe, both of Fujieda; Toru Komatsu, Shimada, all of Japan

[73] Assignee: Murakami Corporation, Shizuoka, Japan

[21] Appl. No.: 09/038,180

[22] Filed: Mar. 10, 1998

[30] Foreign Application Priority Data

Mar. 17, 1997 [JP] Japan ................................. 9-083239

[51] Int. Cl.⁶ .................................................. G02B 5/32
[52] U.S. Cl. .............................. 359/15; 359/1; 359/13; 359/850; 359/884
[58] Field of Search .................................... 359/1, 13, 15, 359/850, 884

[56] References Cited

U.S. PATENT DOCUMENTS

| | | | |
|---|---|---|---|
| 4,882,565 | 11/1989 | Gallmeyer | 340/461 |
| 5,101,193 | 3/1992 | Smith et al. | 340/479 |
| 5,330,264 | 7/1994 | Ando et al. | 359/12 |

Primary Examiner—Cassandra Spyrou
Assistant Examiner—Craig Curtis
Attorney, Agent, or Firm—Hedman, Gibson & Costigan

[57] ABSTRACT

An antiglare inner mirror includes a housing which is supported by a stay and is capable of inclining by an inclining device. A mirror main body is mounted on a front opening portion of the housing. The mirror main body includes a front glass, a hologram element and a seal glass bonded integrally together. A reflecting film is formed on the rear surface of the seal glass. The hologram element consists of a reflecting type hologram element having a reflecting plane made of interference fringes which is arranged non-parallel to the front surface of the hologram element. Incident light from outside is reflected both by the reflecting film and by the interference fringes of the hologram element to form rays of light reflected in different directions.

10 Claims, 6 Drawing Sheets

ANTIGLARE INNER MIRROR

BACKGROUND OF THE INVENTION

This invention relates to an inner mirror for a vehicle having an antiglare function of a novel system.

An antiglare inner mirror is a mirror which is capable of changing the reflectance and capable of mitigating the glare of the headlight of a succeeding automobile by reducing the reflectance.

Figure 2A:
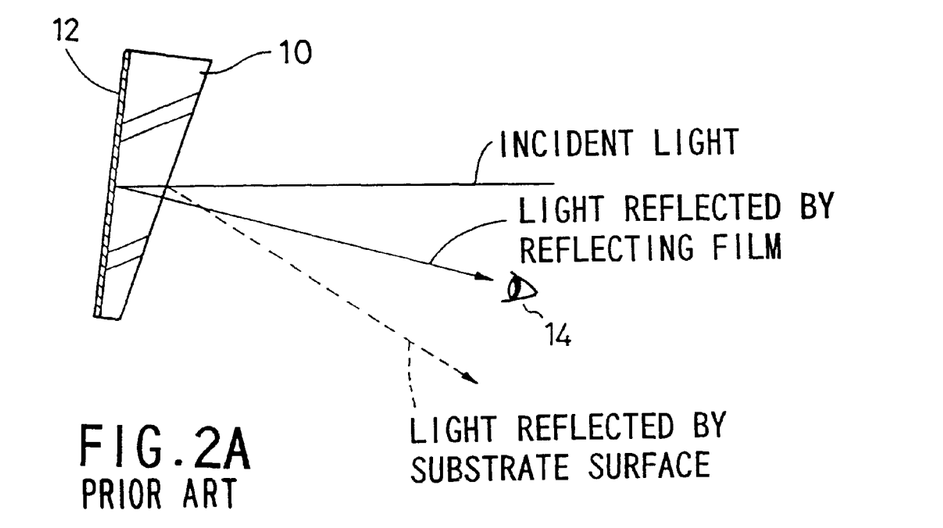
FIGS. 2A and 2B are sectional side views showing a prior art antiglare inner mirror.
Figure 2B:
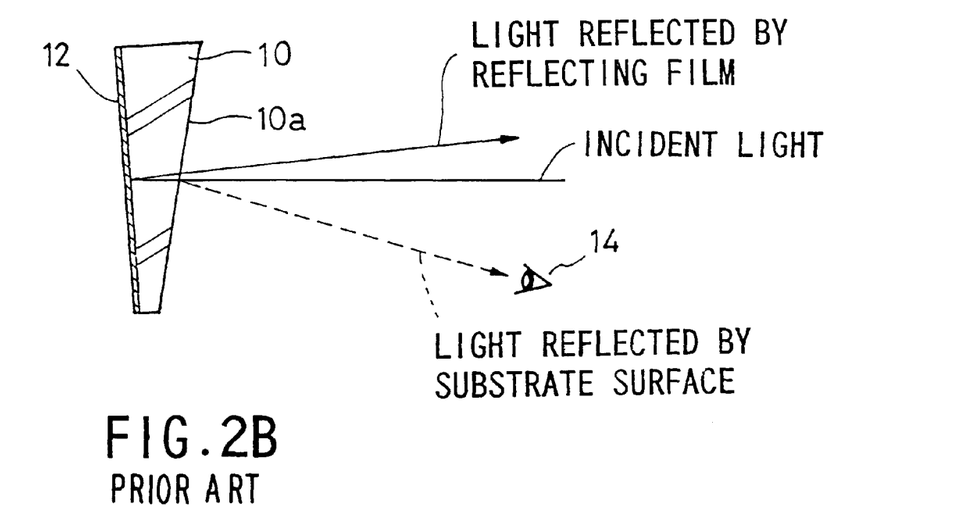

In the past, an inner mirror using a prism has generally been employed. In this prior art mirror, as illustrated in FIGS. 2A and 2B, a transparent glass substrate 10 is made of a prism glass having width changing in the vertical direction and a reflecting film 12 is formed on the rear surface thereof. The glass substrate 10 can be inclined by an inclining device. In the daytime, the glass substrate 10 is inclined downwardly as illustrated in FIG. 2A and incident light from the rear of the automobile (i.e., image from the rear) is reflected by the reflecting film 12 and then is led to the driver's visual point 14. In the night, as illustrated in FIG. 2B, the glass substrate 10 is inclined upwardly and incident light from the rear of the automobile is reflected by a surface 10a of the glass substrate 10 and then is led to the driver's visual point 14. The reflectance by the reflecting film 12 is about 80% whereas the reflactance by the glass substrate surface 10a is only about 4% and, therefore, the glare of the incident headlight of a succeeding automobile in the night can be mitigated.

There has been another type of prior art antiglare inner mirror using a liquid crystal or an electrochromic element for continuously changing the reflectance. In this antiglare mirror, a liquid crystal or an electrochromic element is hermetically enclosed between a pair of glass plates and a reflecting film is formed on the rear glass plate. By controlling electric voltage applied to the liquid crystal or electrochromic element, optical transmittance thereof is controlled and the reflectance thereby is varied.

The prism type antiglare inner mirror illustrated in FIG. 2 is simple in construction and therefore is inexpensive but, since the glass substrate 10 is a prism changing in its width, it is difficult to manufacture this mirror in a case where it is formed in a curved surface for widening the visual field.

The antiglare mirror using a liquid crystal or an electrochromic element requires a drive circuit and a control circuit and, therefore, is rather expensive. Besides, since liquid is hermetically enclosed between the pair of glass plates, when a crack is caused in the glass plates due to an automobile crash, there is the danger that scattered glass injures the passenger.

It is an object of the present invention to solve the above described problems of the prior art and provide an antiglare mirror of a novel system which is simple in construction and is easy to form it in a curved surface.

SUMMARY OF THE INVENTION

According to the invention, there is basically provided an antiglare mirror comprising a reflecting type hologram element having interference fringes arranged therein, a first reflecting plane made of the interference fringes in the hologram element and disposed in non-parallel arrangement to front surface of the hologram element, a second reflecting plane disposed in the rear of the hologram element in non-parallel arrangement to the first reflecting plane, reflectance of light which is incident through the hologram element and is reflected by the second reflecting plane and then comes out through the hologram element being determined at a value different from reflectance of light which is incident through the hologram element and is reflected by the first reflecting plane and then comes out through the hologram element, and angles of the first reflecting plane and the second reflecting plane to a visual point being made adjustable while relative position between the first reflecting plane and the second reflecting plane being maintained unchanged.

According to the invention, there is specifically provided an antiglare inner mirror comprising a substantially transparent substrate, a hologram element mounted fixedly on the rear surface of the substrate, a substantially transparent glass member mounted fixedly on the rear surface of the hologram element, a reflecting film mounted fixedly on the rear surface of the glass member, and an inclining device for inclining the substrate, said hologram element being made of a reflecting type hologram element having interference fringes therein which constitute a reflecting plane which is non-parallel to front surface of the hologram element.

According to the invention, light incident from the rear of the automobile is reflected both by the interference fringes of the hologram element and by the reflecting film provided in the rear of the hologram element. In this case, since the reflecting plane formed by the interference fringes is arranged non-parallel to the front surface of the hologram element, the direction of reflection by the interference fringes can be made different from the direction of reflection by the reflecting film. Accordingly, by differing the reflectance of light reflected by the interference fringes of the hologram element and the reflectance of light reflected by the reflecting film from each other, the reflectance can be changed depending upon which of the reflected light is led to the driver's visual point by operation of the inclining device. Since reflectance by the interference fringes of the hologram element is generally low, it will be convenient if light reflected by the interference fringes is used for the antiglare purpose and light reflected by the reflecting film is normally used (i.e., in the daytime).

The hologram element can be manufactured easily in a large scale if it is made in the form of a film-like element which consists of a synthetic resin film coated with a recording material. By bonding the hologram element to the substrate by means of a transparent pressure sensitive adhesive or other transparent adhesive, scattering of the hologram element in the event of cracking of the substrate due to crash of the automobile can be prevented.

The color of light reflected by the hologram element can be determined by the interval between the interference fringes. By causing a plurality of different intervals to exist between adjacent ones of the interference fringes of the hologram element, a multi-color reflected light can be obtained and color reproduction thereby can be realized. Particularly, by causing intervals between the interference fringes corresponding to red, green and blue to exist, a full-color image can be obtained.

By forming the substrate of a substantially constant thickness, it is easy to manufacture the substrate in a case where the substrate is formed in a curved surface to widen the visual field. In comparison with a case where the mirror is made of a prism glass, the substrate can be lighter and thinner and vibrating proof property and appearance of he mirror are improved. Further, by forming the substrate to one of a flat surface with a constant thickness and constituting a convex mirror optically by arrangement of the interference fringes of the hologram element, a convex mirror of a flat surface can be produced.

BRIEF DESCRIPTION OF THE DRAWINGS

In the accompanying drawings.

DETAILED DESCRIPTION OF PREFERRED EMBODIMENTS

Figure 1A:
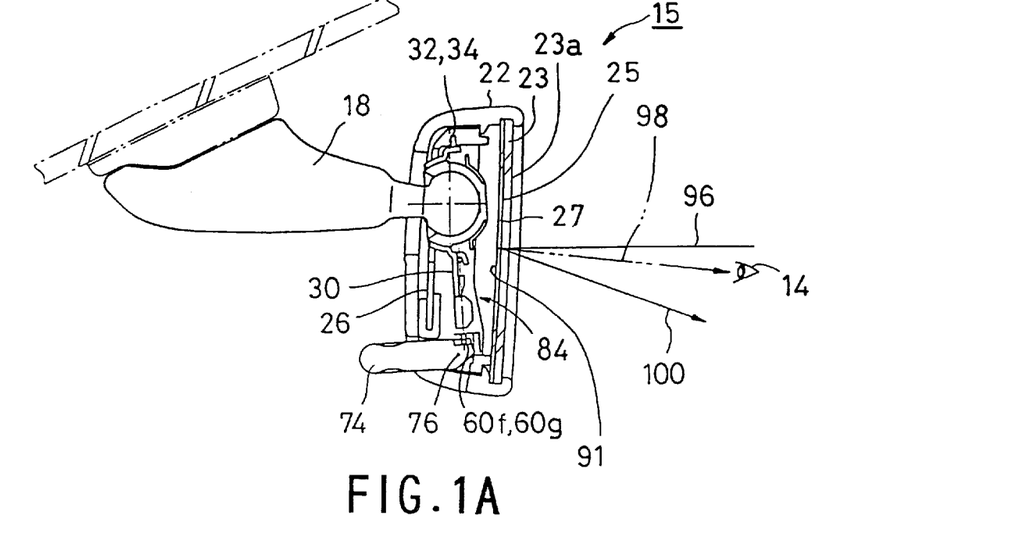
FIGS. 1A and 1B are sectional side views showing an embodiment of the invention.
Figure 1B:
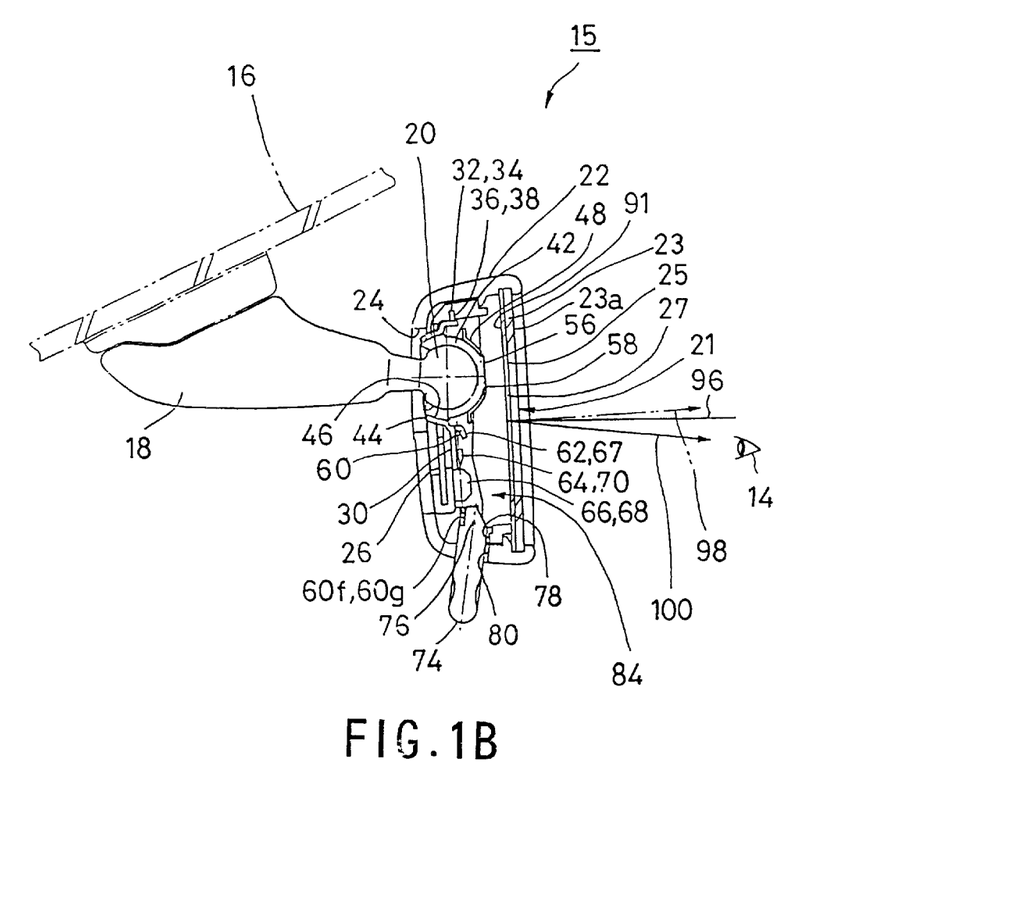
Figure 3A:
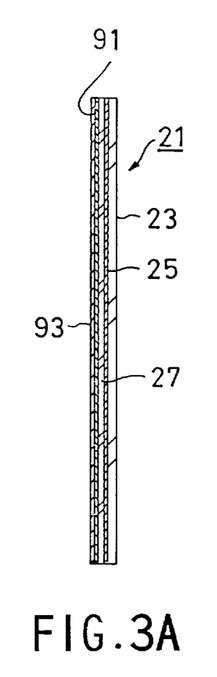
FIGS. 3A, 3B and 3C are views showing respective cross sections of mirror main body 21 of FIGS. 1A and 1B.
Figure 3B:
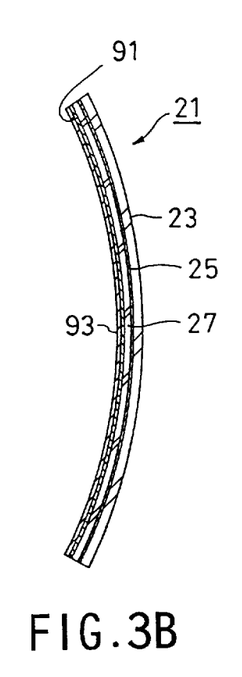
Figure 3C:
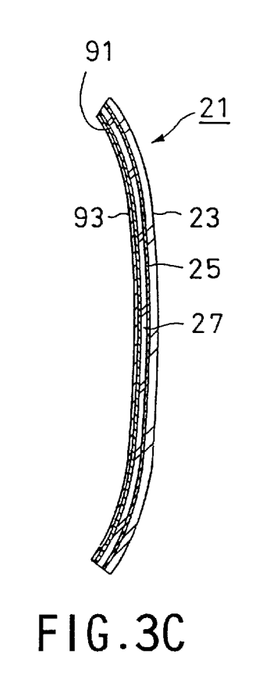
Figure 4:
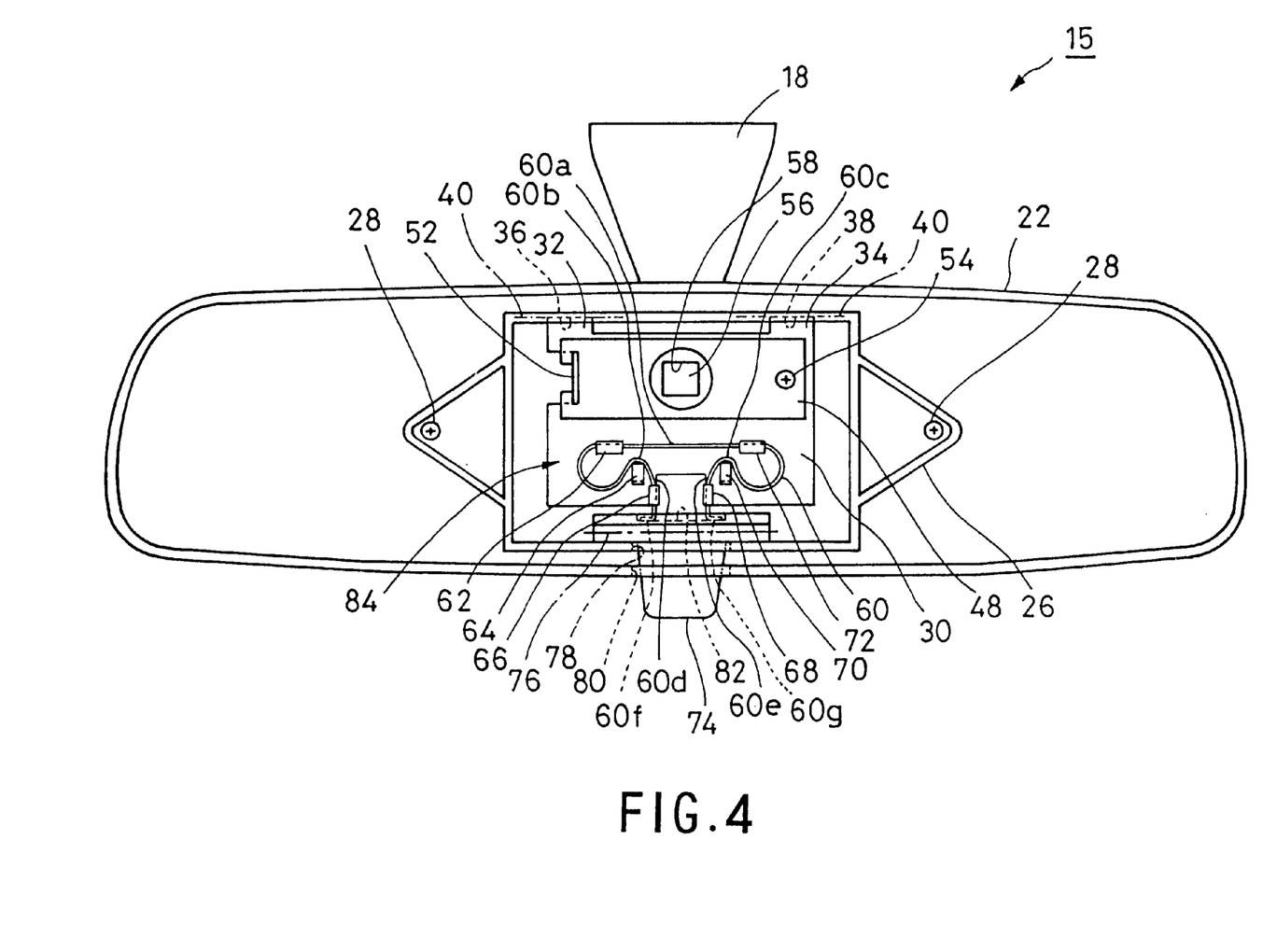
FIG. 4 is a front view of the antiglare inner mirror with its mirror main body being removed.

An embodiment of the invention will be described below with reference to the accompanying drawings. FIG. 1A shows an antiglare inner mirror of the invention in a normal mode (i.e., non-antiglare mode) and FIG. 1B shows the antiglare inner mirror in an antiglare mode. FIG. 3 shows cross sectional shapes of a mirror main body and FIG. 4 is a front view showing the antiglare inner mirror with the mirror main body removed.

In FIG. 1A, an antiglare inner mirror 15 has a stay 18 made of metal which is mounted on a front window 16 of a vehicle. A housing 22 is mounted on the foremost end portion of the stay 18 in such a manner that the housing 22 can move in a pivoting motion in all directions and also can be inclined in vertical direction. A mirror main body 21 is fittedly mounted to a front opening portion of the housing 22. The mirror main body 21 includes a transparent front glass 23 having a constant thickness, a hologram element 25 having a constant thickness which is bonded on the rear surface of the front glass 23 and a seal glass 27 having also a constant thickness which is bonded on the rear surface of the hologram element 25. The mirror main body is formed integrally with a constant thickness. The mirror main body 21 can be formed in a flat plate as shown in FIG. 3A or in a convex shape having a constant radius of curvature as shown in FIG. 3B or in a convex shape having a constant radius of curvature in the central portion as viewed in the direction of its width and having a radius of curvature which is gradually shortened in end portions thereof as shown in FIG. 3C.

The structure of mounting of the housing 22 to the stay 18 will now be described. In FIG. 1, a spherical pivot 20 is provided at the foremost end portion of the stay 18. The pivot 20 is inserted in the housing 22 through an opening 24 formed in the back portion of the housing 22. A spherical seat 42 made of synthetic resin is fitted on the pivot 20 in a manner to be rotated in all directions on the pivot 20. A normal angle adjustment of the mirror can be achieved by rotational movement between the pivot 20 and the spherical seal 42. In the inside of the housing 22, a plate mounting base 26 is fixedly mounted to the housing 22 by means of screws 28 (FIG. 4). A plate 30 made of metal is disposed in front of the plate mounting base 26. The plate 30 has projections 32 and 34 formed in left and right upper end portions thereof which are inserted in a groove 36 formed in the plate mounting base 26 whereby this upper end portion of the plate 30 is pivotably (i.e., in a manner to be capable of inclining) supported on the plate mounting base 26 with this upper end portion constituting a pivot axis 40.

The pivot 20 is inserted through an opening 44 formed in the plate 30 and the spherical seat 42 is supported on a recess 46 formed in the periphery of the opening 44. A spherical seat pressing leaf spring 48 covers the spherical seat 42 from the front side. This leaf spring 48 has, as shown in FIG. 4, its left end portion engaged with an engaging portion 52 of the plate and its right end portion fixed to the plate 30 by means of a screw 54. In this state, a projection 56 which is formed in the top portion of the spherical seat 42 and is of a square shape as viewed from the front side is fitted in a square opening 58 formed in the leaf spring 48 and is pressed by the leaf spring 48 between the plate 30 and the leaf spring 48. By this arrangement, the spherical seat 42 is unmovably fixed to the plate 30 (rotation between the spherical seat 42 and the pivot 20 is maintained).

As shown in FIG. 4, a wire spring 60 is mounted on the plate 30 in a manner to be supported by support fittings 62, 64, 66, 68, 70 and 72. The support fittings 62 and 72 prevent upward movement of an upper portion 60a of the wire spring 60. The support fittings 64 and 70 prevent downward movement of middle portions 60b and 60c of the wire spring 60. The support fittings 66 and 68 support vertical portions 60d and 60e in a manner to allow vertical sliding movement of the vertical portions 60d and 60e.

A changeover lever 74 is mounted on and supported by the plate mounting base 26 pivotably about a pivoting axis 76. A lower portion of the changeover lever 7 projects to the outside of the housing 22 through openings 78 and 80 formed in the lower portions of the plate mounting base 26 and the housing 22 so that the driver can manually operate the changeover lever 74. In the upper portion of the changeover lever 74, there is formed a groove 82 in a portion offset from the rotation axis 76 and left and right lower end portions 60f and 60g of the wire spring 60 are received and held by this groove 82. The wire spring 60 is supported by the plate 30 in a vertically compressed state and thereby applies a pressing force between the plate 30 and the changeover lever 74. The plate 30, wire spring 60 and the changeover lever 74 constitute an inclining device 84.

In the antiglare mode of FIG. 1B in which the changeover lever 74 is pulled forwardly to a vertically erected posture, the lower end portions 60f and 60g of the wire spring 60 are located behind the pivoting axis 76 of the changeover lever 74 (in this state, pivoting of the changeover lever 74 is stopped at a predetermined position of the plate mounting base 26) whereby the plate 30 is disposed substantially in parallel to the plate mounting base 26.

As the changeover lever 24 is moved rearwardly, the relative position between the lower end portions 60f and 60g of the wire spring 60 and the pivoting axis 76 is changed and the plate 30 and the plate mounting base 26 are thereby pivoted relative to each other about the projections 32 and 34 in the upper end portion which constitute the pivoting axis. In this case, there is no relative pivoting between the plate 30 and the stay 18 and, therefore, the plate mounting base 26 is pivoted in a direction in which the plate mounting base 26 is spaced away from the plate 30. This causes the housing 22 to which the plate mounting base 26 is fixed to be inclined downwardly to a position of the normal mode shown in FIG. 1A (in this state, the pivoting of the changeover lever 74 is stoped at a predetermined position of the plate mounting base 26).

In the foregoing manner, inclining operation of the inclining device 84 is realized. The normal angle adjustment of the mirror can be realized by manually operating the housing 22 and thereby causing the spherical seat 42 to be rotated over the pivot 20.

Figure 5:
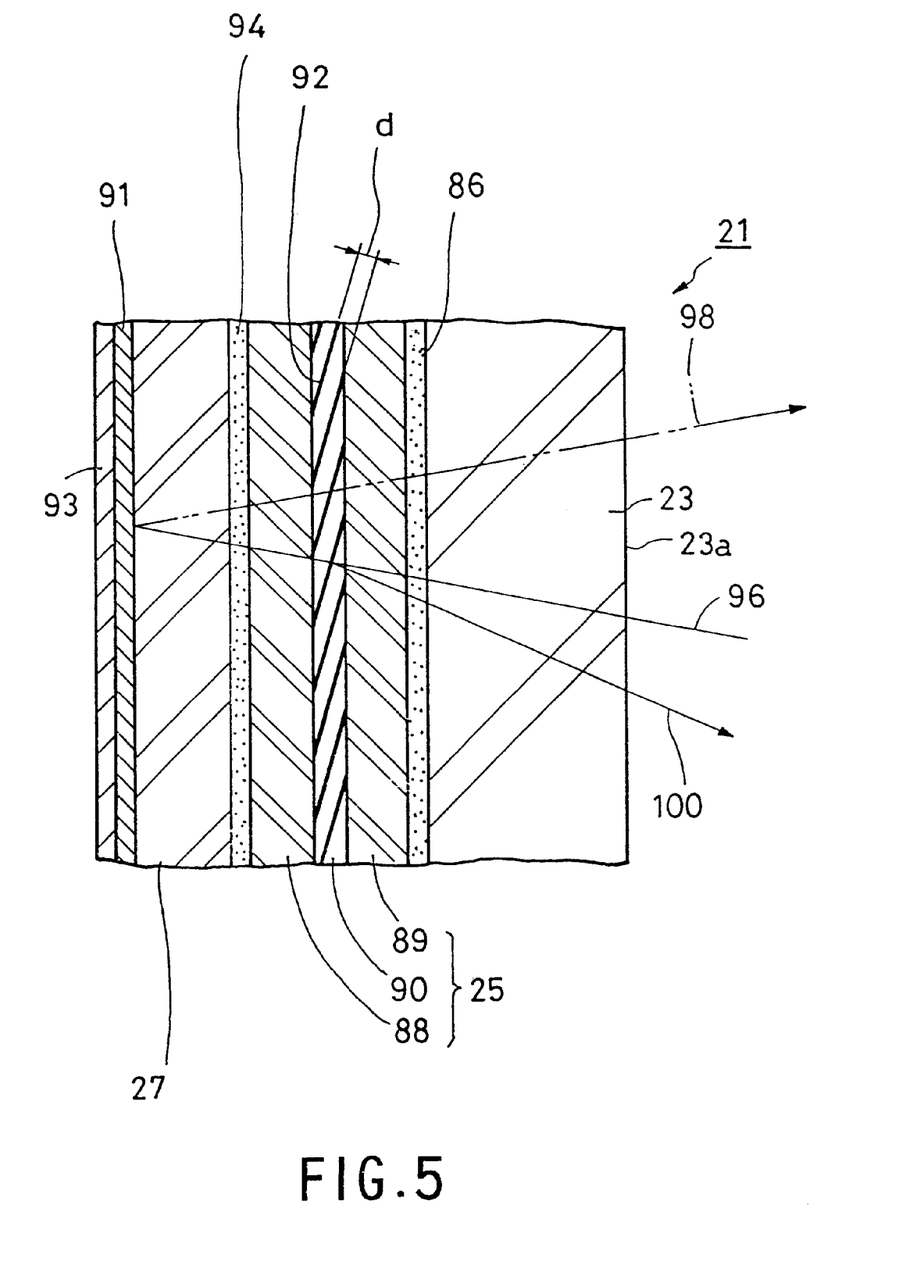
FIG. 5 is a vertical sectional view of the mirror main body.

The mirror main body 21 will now be described more in detail. FIG. 5 is a vertical sectional view showing specifically an example of the mirror main body 21 (thickness of each portion is not accurately illustrated). The front glass 23 is made of a transparent glass substrate having a constant thickness. The hologram element 25 is bonded to the entire rear surface of the front glass 23 by means of a transparent pressure sensitive adhesive or other transparent adhesive 86. In this example, the hologram element 25 is formed as Lippmann hologram which is a reflecting type hologram consisting of a cell structure which is integrally composed of base films 88 and 89 made of synthetic resin and recording material 90 such as a photo-polymer which is formed to a film having a constant thickness between the base films 88 and 89. In the recording material 90, interference fringes 92 in the form of flat planes are formed due to difference in refractivity and constitute a phase type hologram. These interference fringes 92 constitute reflecting planes (first reflecting plane) which are inclined by a certain angle with respect to the front surface of the hologram element 25. The interference fringes 92 of such flat planes can be obtained by recording interfering parallel waves. There exist a plurality of intervals d between adjacent interference fringes 92. The hologram element 25 may be made by, for example, exposing a single dry plate sequentially with blue, green and red light to form a master hologram and then duplicating holograms on the basis of this mater hologram.

The seal glass 27 is bonded on the entire rear surface of the hologram element 25 by means of a pressure sensitive adhesive or other adhesive 94. A reflecting film 91 made of Al or Ag is formed on the rear surface of the seal glass 27 and the rear surface of the reflecting film 91 is coated with a protecting coat 93. Thus, the mirror main body 21 is formed integrally with the hologram element 25 being hermetically enclosed between the two glasses 23 and 27.

Figure 6:
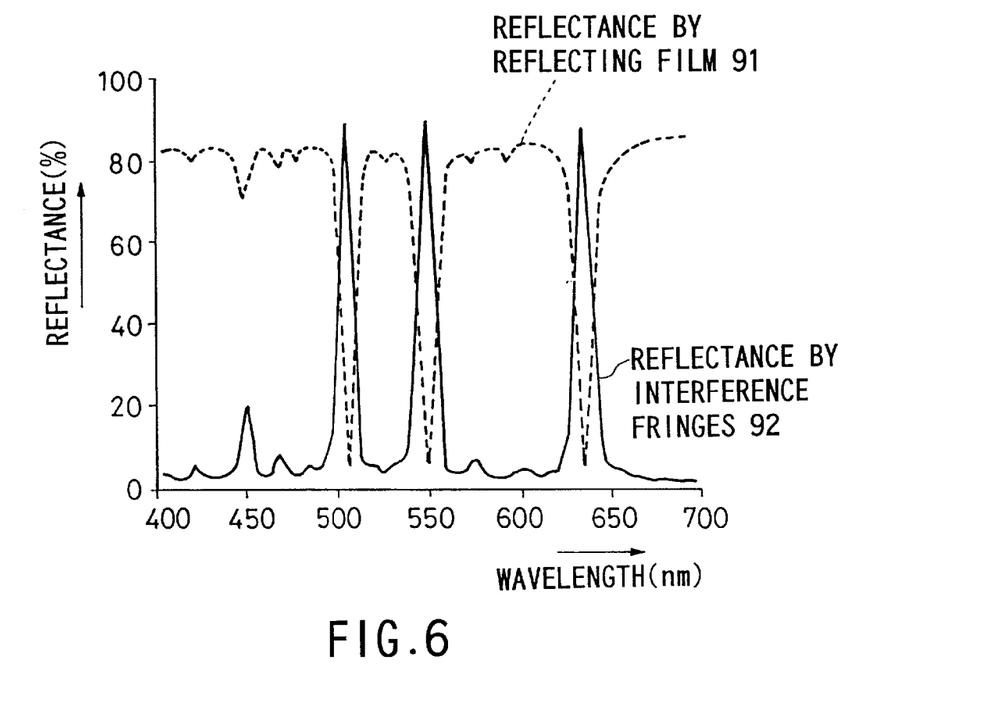
FIG. 6 is a characteristic diagram showing the diffraction efficiency of a hologram element 25 of FIG. 1.

According to the structure of FIG. 5, incident light 96 from the outside is incident on the hologram element 25 through the front glass 23 and the transparent pressure sensitive adhesive or other adhesive 86 and a part of the incident light is reflected by the interference fringes 92. This reflected light 100 passes through the transparent pressure sensitive adhesive or other adhesive 86 and the front glass 23 and comes out of the front surface 23a of the front glass 23. The incident light which has passed through the interference fringes 92 is reflected by the reflecting film 91 and comes out as the reflecting light 98. Since the reflecting plane formed by the interference fringes 92 is inclined with respect to the reflecting film 91, the reflected light 98 from the reflecting film 91 and the reflected light 100 from the interference fringes 92 are reflected in different directions. The diffraction efficiency (reflectance) by the hologram element 25 is as shown in FIG. 6. Average intensity of the entire spectra of the reflected light 100 by the interference fringes 92 is much lower than average intensity of the entire spectra of the reflected light 98 by the reflecting film 91. Accordingly, as shown in FIG. 1B, an image which is obtained by leading the reflected light 100 by the interference fringes 92 to the driver's visual point 14 can be used as an image during the antiglare mode and an image obtained by leading the reflected light 98 by the reflecting film 91 to the driver's visual point 14 can be used as an image during the normal mode. According to the characteristics shown in FIG. 6, a full color image can be obtained both in the normal mode and the antiglare mode.

Figure 7:
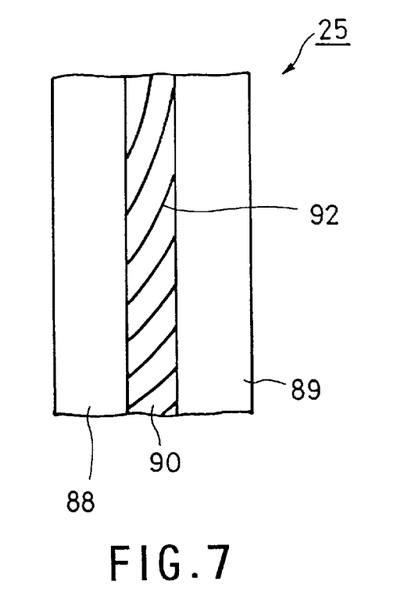
FIG. 7 is a sectional view showing another embodiment of interference fringes arranged in the hologram element 25.

In the above described embodiment, description has been made about the case where the interference fringes 92 are formed in flat planes and the interference fringes 92 are arranged in parallel to one another. By forming the interference fringes 92 in a convex shape as shown in FIG. 7, a convex mirror with a flat substrate can be provided. Such curved interference fringes 92 can be obtained by causing parallel waves to interfere with spherical waves and recording resultant waves.

The hologram element is not limited to the cell structures shown in FIGS. 5 and 7 but various other structures such as a structure formed by fixing a recording material film on a single base film and a structure in the form of a dry plate which is composed of a substrate (such as the front glass 23 in FIG. 5) on the rear surface of which a recording material film is directly fixed without using a base film may be used.

What is claimed is:

1. An antiglare inner mirror comprising:
   a reflecting member including;
      a substantially transparent substrate;
      a hologram element, having a front and a rear surface, said hologram element being mounted fixedly on the rear surface of the substrate;
      a substantially transparent member mounted fixedly on the rear surface of the hologram element;
      a reflecting film mounted fixedly on the rear surface of the transparent member; and
      an inclining device for inclining the reflecting member;
   said hologram element being made of a reflecting type hologram element having interference fringes therein which constitute a reflecting plane which is nonparallel to the front surface of the hologram element;
   wherein said inclining device inclines the reflecting member in a first position and a second position, respectively; wherein the inclining device in the second position inclines the reflecting member such that reflectance of light which is incident from the surface of the substrate and is reflected by the interference fringes of the hologram element, and that, subsequently, comes out of the surface of the substrate, is determined at a value which is lower than a value of reflectance of light obtained when the inclining device is in a first position in which the reflecting member is inclined such that light is reflected by the reflecting film and then comes out of the surface of the substrate through the hologram element.

2. An antiglare inner mirror as defined in claim 1 wherein said substrate consists of a glass substrate having a constant thickness.

3. An antiglare inner mirror as defined in claim 1 wherein said interference fringes are arranged with a plurality of different intervals existing between adjacent ones of the interference fringes.

4. An antiglare inner mirror comprising:
   a reflecting mirror including:
      a hologram element mounted fixedly on the rear surface of the substrate;
      a substantially transparent member mounted fixedly on the rear surface of the transparent member;
      a housing holding the reflecting member fixedly with a front surface of the reflecting member being exposed to the outside;
      a stay for mounting the housing to a vehicle and supporting the housing; and
      an inclining device provided between the stay and the housing for inclining the housing with respect to the stay;

said hologram element being made of a reflecting type hologram element having interference fringes therein which constitute a reflecting plane which is non-parallel to said front surface of the hologram element;

wherein said inclining device inclines the reflecting member in a first position and a second position, respectively; wherein the inclining device in the second position inclines the reflecting member such that reflectance of light which is incident from the surface of the substrate and is reflected by the interference fringes of the hologram element, and that, subsequently, comes out of the surface of the substrate, is determined at a value which is lower than a value of reflectance of light obtained when the inclining device is in a first position in which the reflecting member is inclined such that light is reflected by the reflecting film and then comes out of the surface of the substrate through the hologram element.

5. An antiglare inner mirror as defined in claim 4 wherein said substrate consists of a glass substrate having a constant thickness.

6. An antiglare inner mirror as defined in claim 2 wherein said substrate is formed as a convex surface.

7. An antiglare inner mirror as defined in claim 5 wherein said substrate is formed as a convex surface.

8. An antiglare inner mirror as defined in claim 1 wherein said substrate is formed in a flat plate and said interference fringes are arranged in such a manner that the reflecting plane made of the interference fringes of the hologram element constitutes a convex mirror.

9. An antiglare inner mirror as defined in claim 4 wherein said substrate is formed in a flat plate and said interference fringes are arranged in such a manner that the reflecting plane made of the interference fringes of the hologram element constitutes a convex mirror.

10. An antiglare inner mirror as defined in claim 4 wherein said interference fringes are arranged with a plurality of different intervals existing between adjacent ones of the interference fringes.

* * * * *